United States Patent [19]
Hook

[11] 3,842,971
[45] Oct. 22, 1974

[54] AUGER AND PADDLE CONVEYOR APPARATUS

[75] Inventor: Richard Wayne Hook, Des Moines, Iowa

[73] Assignee: Deere & Company, Moline, Ill.

[22] Filed: Jan. 19, 1973

[21] Appl. No.: 325,177

[52] U.S. Cl................................. 198/213, 198/160
[51] Int. Cl............................................. B65g 33/00
[58] Field of Search......... 198/160, 229, 213; 418/4

[56] References Cited
UNITED STATES PATENTS
| | | | |
|---|---|---|---|
| 703,190 | 6/1902 | Geurink | 198/229 UX |
| 944,581 | 12/1909 | Stevens | 418/4 X |
| 1,282,205 | 10/1918 | Funger | 198/160 |

FOREIGN PATENTS OR APPLICATIONS
| | | | |
|---|---|---|---|
| 35,642 | 11/1913 | Sweden | 198/229 |

Primary Examiner—Evon C. Blunk
Assistant Examiner—Douglas D. Watts

[57] ABSTRACT

Conveyor apparatus comprising a vertically disposed auger enclosed by a housing, and a paddle mechanism cooperable with the auger to assist the latter in conveying material upwardly through the housing, the paddle mechanism including an endless chain having a series of paddles secured thereto, the paddles being supported by the chain to advance upwardly through the housing between axially aligned portions of the auger flight and each having a face for engaging material on the flight and thereby preventing the material from gravitating downwardly along the flight. The chain supporting the paddles is inclined away from the housing wall in the direction in which material is conveyed by the auger, so that the paddles are withdrawn outwardly through the housing wall as they are moved therealong.

11 Claims, 4 Drawing Figures

AUGER AND PADDLE CONVEYOR APPARATUS

BACKGROUND OF THE INVENTION

The present invention relates generally to material conveyor apparatus and more particularly to such apparatus comprising an auger having paddle means cooperable therewith to increase the conveying efficiency of the auger.

Since an auger conveyor does not positively displace material as do bucket or chain-type conveyors, but instead operates by deflecting material along a path defined by a trough or housing in conjunction with which it operates, the efficiency of such a conveyor is dependent upon such factors as the coefficient of friction between the material being conveyed and the auger flight and housing wall, and gravitational forces. In auger conveyors of conventional design, the force of gravity operates to substantially reduce the conveying efficiency when the auger housing is inclined from a level, horizontal position, due to the tendency of the material being conveyed to gravitate downwardly through the housing along the auger flight. As a result, auger conveyors have generally not been used in vertical or near-vertical applications. It is desirable, of course, due to their relative simplicity and resulting economy, to be able to utilize auger conveyors in vertical as well as in horizontal applications.

An apparatus for substantially increasing the efficiency of an inclined or vertical auger conveyor is disclosed in co-pending U.S. Pat. application, Ser. No. 209,116, filed Dec. 17, 1971, and comprises a series of paddles movable through the auger housing adjacent to axially aligned portions of the helical flight and having faces disposed to engage material being conveyed by the auger to prevent the same from gravitating down through the housing. The apparatus is disclosed in the aforesaid application on a sugar beet harvester and is used for conveying harvested beets vertically. Experience with this apparatus has revealed that, although sound in basic principle, certain features thereof are not entirely satisfactory under all harvesting conditions. One problem encountered, for example, has been that of excessive beet damage caused by the paddles at the point where they exit from the housing. As disclosed in the aforementioned application, the paddles accelerate around a drive sprocket as they exit, and the upper edge of the paddle is swung rapidly upwardly relative to the housing wall. Beets lying on the upper edge of the paddles are thus sliced by the cooperative action of the paddles and housing walls as the paddles exit from the housing. Additional damage has resulted from beets becoming wedged between the leading surface of the flight and the adjacent, trailing edges of the paddles, since although the pitch dimensions of the flight and paddles are the same, manufacturing tolerances result in variations in the clearance between the flight and the paddles as the latter move through the housing.

SUMMARY OF THE INVENTION

It is the primary object of the present invention to provide an improved auger and paddle conveyor apparatus having none of the aforementioned problems of the prior art. More particularly, it is an object of the invention to provide such apparatus wherein the paddles are removed from the auger housing in such a manner that no damage is caused to the material being conveyed.

It is a further object to provide such apparatus so constructed that no wedging action occurs between the lower edges of the paddles and the leading surface of the auger flight.

It is yet a further object to provide such apparatus in which acceleration forces acting on the paddle mechanism are minimized.

It is a still further object of the invention to provide such apparatus characterized by its simplicity and economy.

These and other objects and advantages are achieved by the invention which comprises, generally, an auger at least partially enclosed by a housing and having a helical flight with a material-engaging leading surface, and a paddle mechanism including a plurality of individual paddles supported to move successively through the housing between axially aligned flight portions and having material-engaging faces operative to engage material being conveyed by the auger. The paddles are supported to move through the housing along a line inclined away from the axis of the auger in the directon in which material is conveyed, so that they are gradually withdrawn outwardly from the housing as they move therethrough, thereby causing no damage to the conveyed material. The pitch dimension of the paddle mechanism, or the distance between adjacent paddles, is larger than the pitch dimension of the auger flight so that the clearance between the trailing edges of the paddles and the leading surface of the flight continually increases as the paddles move through the housing. To reduce acceleration forces, an odd number of paddles are mounted on an endless flexible element trained around a pair of spaced rollers, so that the acceleration forces caused by the paddles moving around the rollers alternate between the spaced rollers.

BRIEF DESCRIPTION OF THE DRAWINGS

The preferred embodiment of the present invention will be described in conjunction with the accompanying drawings in which.

DESCRIPTION OF THE PREFERRED EMBODIMENT

Figure 1:
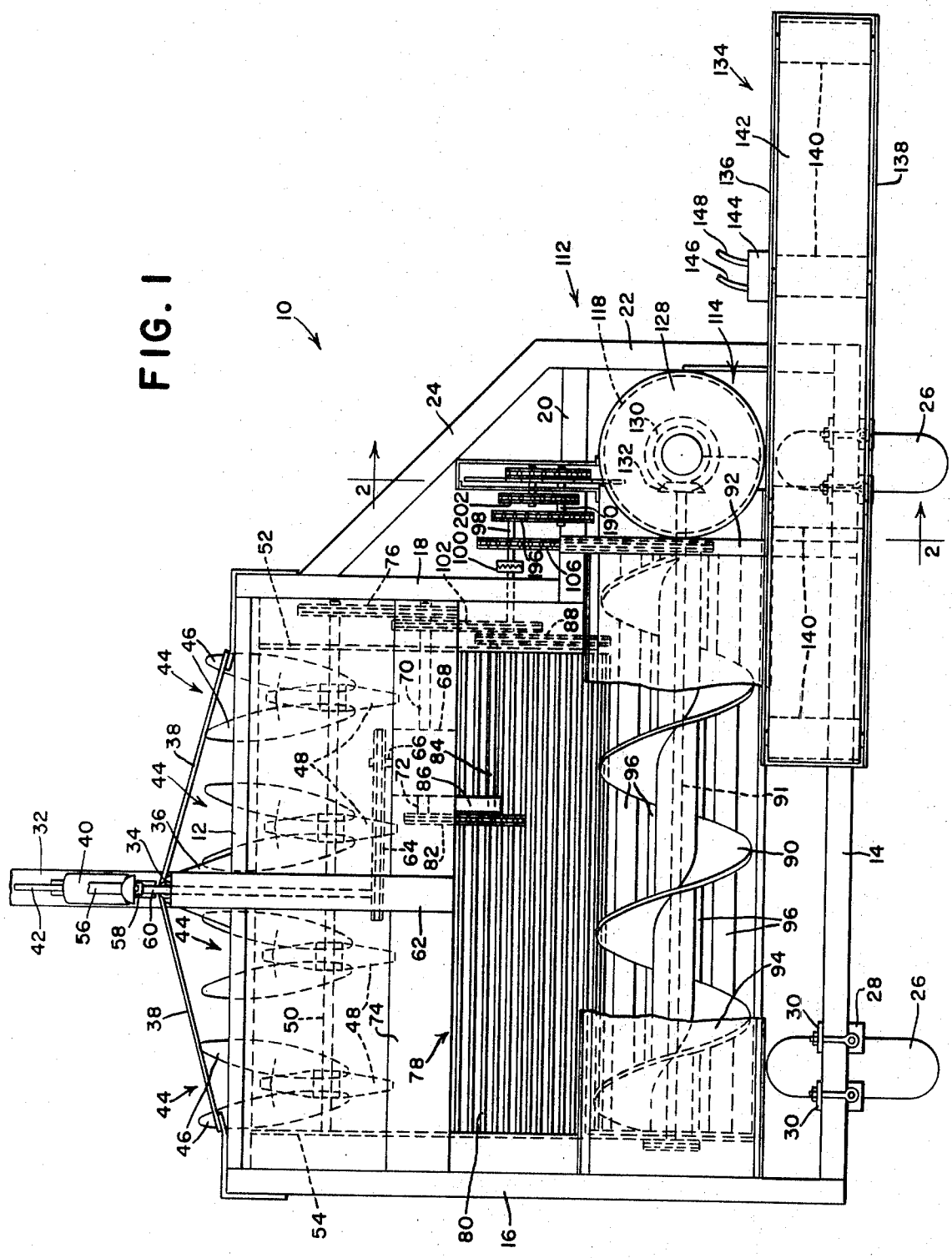
FIG. 1 is a plan view of a sugar beet harvester incorporating the auger and paddle conveyor apparatus of the invention.

Referring now to the drawings, the conveyor apparatus of the invention is illustrated as incorporated in a novel beet harvester designated in its entirety by the numerals 10. Various features of this harvester are disclosed and claimed in the following U.S. Pat. applications: Ser. No. 209,116, filed Dec. 17, 1971, Ser. No. 209,117, filed Dec. 17, 1971, Ser. No. 209,123, filed Dec. 17, 1971, Ser. No. 209,124, filed Dec. 17, 1971, Ser. No. 229,669, filed Feb. 28, 1972. The present invention is an improvement on the auger and paddle conveyor apparatus disclosed in U.S. Pat. application Ser. No. 209,116, filed Dec. 17, 1971.

The beet harvester 10 includes a main supporting framework composed of a front transverse frame member 12, a rear transverse frame member 14, a left longitudinal side frame member 16 connecting the left ends of the front and rear frame members, a first right longitudinal side frame member 16 connected to and extending rearwardly from the right end of the front frame member, a transverse frame member 20 connected to the rear end of the member 18 and extending outwardly therefrom, a second right longitudinal side frame member 22 connecting the right ends of the frame members 20 and 14, and a diagonal brace member 24 connecting a forward portion of the member 18 with the front end of the member 22. The rear of the frame is supported by a pair of ground-engaging wheels 26 mounted in a transversely adjustable manner on the rear transverse frame member 14. Each wheel 26 is rotatably supported on an axle which extends between the legs of a U-shaped support member or fork 28. Each fork 28 is connected to the rear transverse frame member 14 by a pair of clamp assemblies 30 which are releasable to permit lateral adjustment of the fork on the frame member 14 so that the wheels 26 may be positioned to accommodate various row spacings.

The forward end of the main frame is supported by a hitch member 32 shown fragmentarily in the drawings and adapted at its forward end for connection to the drawbar of a tractor. The rear of the hitch member 32 is connected to the main frame for relative pivotal movement about both vertical and transverse axes. The vertical axis is defined by a shaft 34 which is supported on the front frame member 12 by a pair of generally triangular, vertically spaced plates 36 which are connected to and extend forwardly from the frame member 12, and a pair of brace members 38 which are connected to opposite sides of the member 12 and converge forwardly to the apex of the triangular plates 36. The rear of the hitch member 32 is supported for vertical pivotal movement on a bracket (not shown) fixed to the lower end of the shaft 34. The vertical position of the hitch relative to the main frame is adjusted by means of a hydraulic cylinder 40 which interconnects a bracket 42 secured to the top side of the hitch member 32 and a bracket (not shown) fixed to the upper end of the shaft 34. The lateral position of the hitch member 32 about the pivot shaft 34 is controlled by a conventional row finder unit and hydraulic cylinder which are not shown in the drawings since they form no part of the present invention.

Mounted on the front transverse frame member 12 and movable vertically therewith into and out of engagement with the ground are a plurality of transversely spaced digger wheel units 44, each unit comprising a cooperating pair of digger wheels 46 rotatably supported on opposite sides of a vertical standard (not shown) connected at its upper end to the front frame member 12 for relative lateral adjustment. The digger wheel units are adjustable relative to the frame member 12 to accommodate various row spacings. Associated with each digger wheel unit 44 is a paddle wheel 48 which extends between the upper rear portions of the wheels 46. The paddle wheels 48 are supported on a common transverse shaft 50 which is rotatably supported at opposite ends in vertical support plates 52 and 54 on the right and left sides, respectively, of the frame. The paddle wheels are mounted on the shaft 50 so that they can be adjusted laterally with their associated digger wheel units.

The paddle wheels 48 are driven in a counterclockwise direction, as viewed from the left side of the machine, by the shaft 50 to engage and advance to the rear beets removed from the ground by the digger wheels 46. Power is supplied for driving the shaft 50, as well as for driving the other operating components on the harvester which have not yet been described, from the power take-off shaft of the tractor. A first shaft 56 is connected at its forward end to the tractor power take-off shaft (not shown) and at its rearward end by means of a universal connection 58 to the forward end of a frame supported shaft 60. An inverted U-shaped shield 62 covers the shaft 60. The rear end of the shaft 60 has a sheave thereon which is drivingly connected by means of a chain 64 to a transversely spaced sheave on the input shaft 66 of a gear box 68. A pair of shafts 70 and 72 extend transversely outwardly from the gear box 68, the shaft 70 being journaled at its outer end in the support plates 52. The gearing within the gear box 68 is arranged so that the shafts 70 and 72 are driven in opposite directions, the shaft 70 being driven in a counterclockwise direction as viewed from the left of the machine, and the shaft 72 being driven in a clockwise direction when viewed in the same manner. The shafts 70 and 72 are covered by a horizontal shield 74 which extends transversely between the frame members 16 and 18 and serves also as a support for the gear box 68. An inner sprocket 75 (see FIG. 4) and an outer sprocket are mounted on the extreme outer end of the shaft 70. A chain 76 drivingly connects the outer sprocket on the shaft 70 with a sprocket on the extreme outer end of the paddle wheel support shaft 50, to drive the latter and thereby the paddle wheels 48.

In operation, the paddle wheels 48 are thus operative to engage beets which have been lifted from the ground by the digger wheels 46 and advance them rearwardly. The beets are delivered by the paddle wheels to a chain conveyor designated generally by the numeral 78 which extends transversely between the support plates 52 and 54 and upwardly and rearwardly from a point directly behind the digger wheel units 44. The conveyor 78 includes upper and lower transverse support shafts (not shown) which extend between and are journaled on the support plates 52 and 54. A plurality of transversely spaced sprockets are mounted on each of the shafts and engage an endless conveyor chain 80 to drive the same in a clockwise direction as viewed from the right of the machine so that the upper run of the chain moves upwardly and rearwardly. Power is transmitted to the conveyor 78 from a sprocket on the outer end of the shaft 72 by means of a chain 82 which drivingly connects that sprocket with a sprocket mounted on the left end of a shaft 84 which is rotatably supported at opposite ends in a bracket 86 fixed to the shield 74 and the support plate 52. A second sprocket on the right end of the shaft 84 is drivingly connected by means of a chain 88 to a sprocket on the right end of the upper conveyor shaft, to drive the upper shaft and thereby the conveyor chain 80. In operation, the chain conveyor 78 is thus operative to receive beets delivered rearwardly by the paddle wheels 48 and deliver the same upwardly and rearwardly.

Extending across the rear of the machine is a transverse conveyor in the form of a large diameter auger 90, the auger including a central shaft 91 journaled at its left end in the support plate 54 and at its right end in a bracket (not shown) depending from a bar 92 which extends between the frame members 14 and 20. The upper and rear portions of the auger 90 are enclosed by an arcuate shield 94 which is coextensive with the auger. A trough is formed for the auger by four transversely extending cleaning rolls 96, the axes of the rolls being disposed at equal radial distances from the shaft 91 of the auger 90 so that the rolls define an arcuate beet-receiving trough immediately beneath the auger. The left ends of the rolls 96 are journaled in the support plate 54 and the right ends thereof are journaled in brackets (not shown) fixed to the bar 92. Adjacent cleaning roll pairs are driven in opposite directions through drive means not pertinent to the present invention.

The auger 90 is driven to advance beets deposited by the chain conveyor 78 into the trough formed by the cleaning rolls 96 transversely toward the right side of the machine, from the inner sprocket 75 on the outer end of the right shaft 70. The drive train includes a countershaft 98 which extends transversely outwardly from the right support plate 52. A slip clutch 100 connects the inner and outer portions of the shaft 98. The shaft 98 is driven by means of a chain 102 which connects the sprocket 75 on the shaft 70 with a first sprocket 104 on the inner left end portion of the shaft 98, and the auger 90 is driven from the countershaft 98 by a chain 106 which connects a second sprocket 108 on the outer portion of the countershaft 98 with a sprocket 110 on the right end of the auger shaft 91.

The beets conveyed toward the right side of the machine by the auger 90 are delivered to the vertical conveyor apparatus of the invention, designated generally by the numeral 112. The conveyor apparatus 112, which will be described later in greater detail, includes a cylindrical auger housing 114 supported between the frame members 14 and 20 just inwardly of the frame member 22, the housing including a vertically extending cylindrical wall 116 which encloses a vertical auger conveyor 118. Beets are delivered to the vertical auger 118 by the horizontal auger 90 through an opening in the lower end of the housing 114. The auger 118 includes a cylindrical core tube 120 and helical flighting 122 which extends around the tube 120 and is secured thereto along its inner helical edge. A shaft 124 is supported within the core tube and is, in turn, rotatably supported at its lower end in the bottom wall 126 of the housing 114 and at its upper end in the top wall 128 of the housing. The auger is rotated to convey beets upwardly through the housing 114 by means of a bevel gear 130 on the lower end of the shaft 124 which is in driving engagement with a bevel gear 132 on the right end of the horizontal auger shaft 91.

Supported on the upper end of the housing 114 is a transverse conveyor designated generally by the numeral 134. The conveyor 134 includes a supporting framework having a pair of upright walls 136 and 138 and an endless belt-type conveyor disposed between the lower portions of the walls and including a plurality of rollers 140 extending between and journaled in the walls 136 and 138. An endless flexible conveying element 142 is drivingly trained around the rollers 140. Power is furnished for driving the conveyor 134 by a hydraulic motor 144 which drives one of the rollers 140. The hydraulic motor 144 is supplied with hydraulic fluid under pressure from a source on the tractor through hydraulic lines 146 and 148. In operation, beets conveyed upwardly by the vertical auger 118 are discharged rearwardly through an opening in the upper end of the housing 114 which communicates with an opening in the wall 136 of the transverse conveyor support, onto the upper run of the conveying element 142. The element 142 is operative to convey the beets transversely to the right end of the conveyor 134, where they are dropped into a suitable receptacle, which conventionally consists of a truck driven alongside the harvester.

Figure 2:
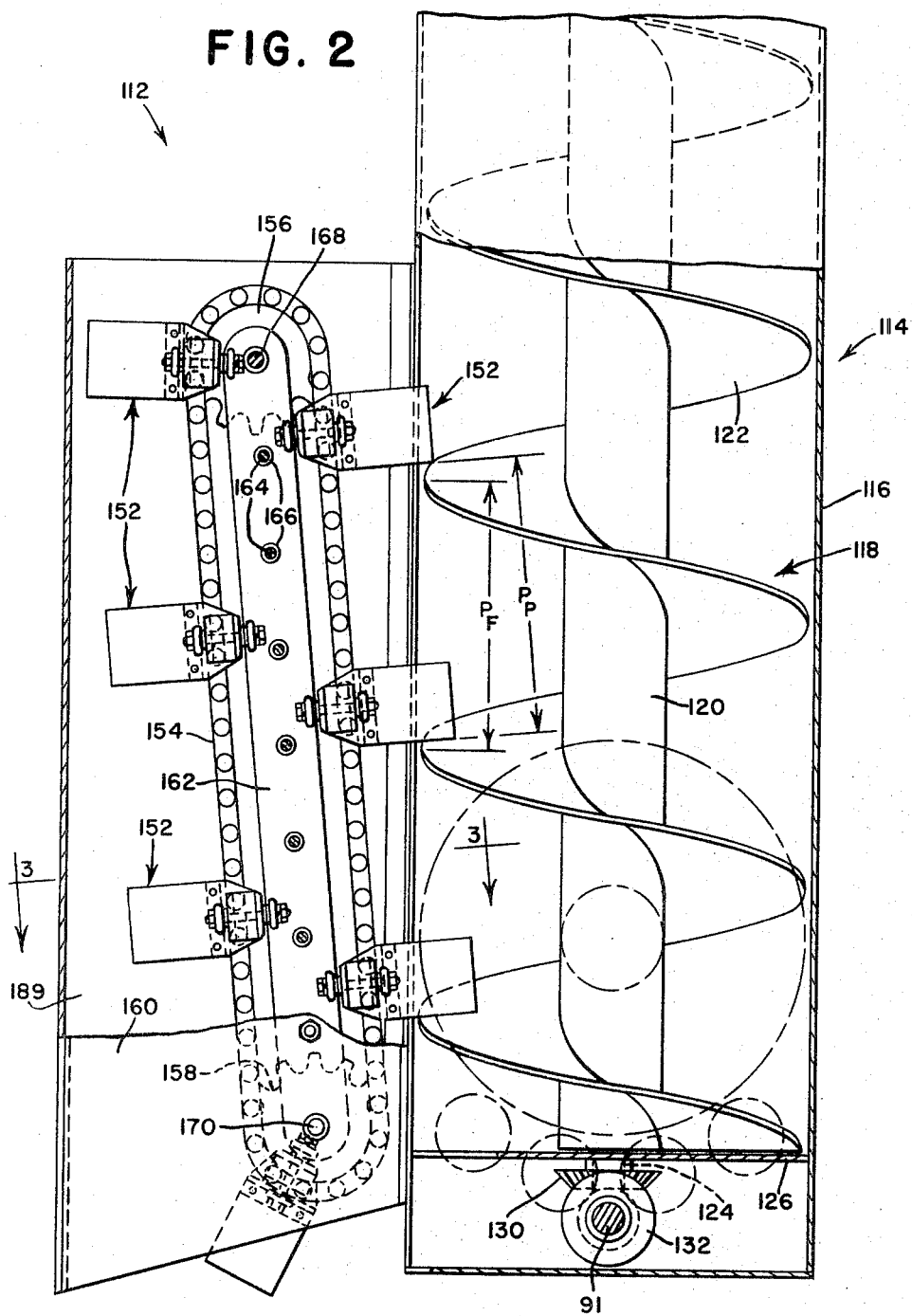
FIG. 2 is an enlarged view of the conveyor apparatus taken along the line 2—2 of FIG. 1.
Figure 3:
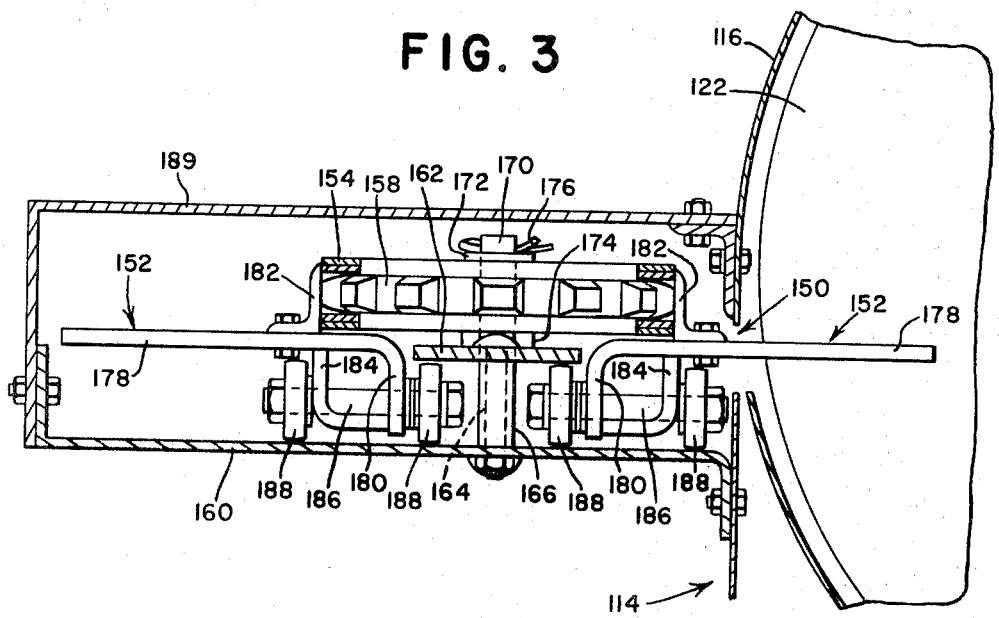
FIG. 3 is an enlarged sectional view of the apparatus taken along the line 3—3 of FIG. 2.
Figure 4:
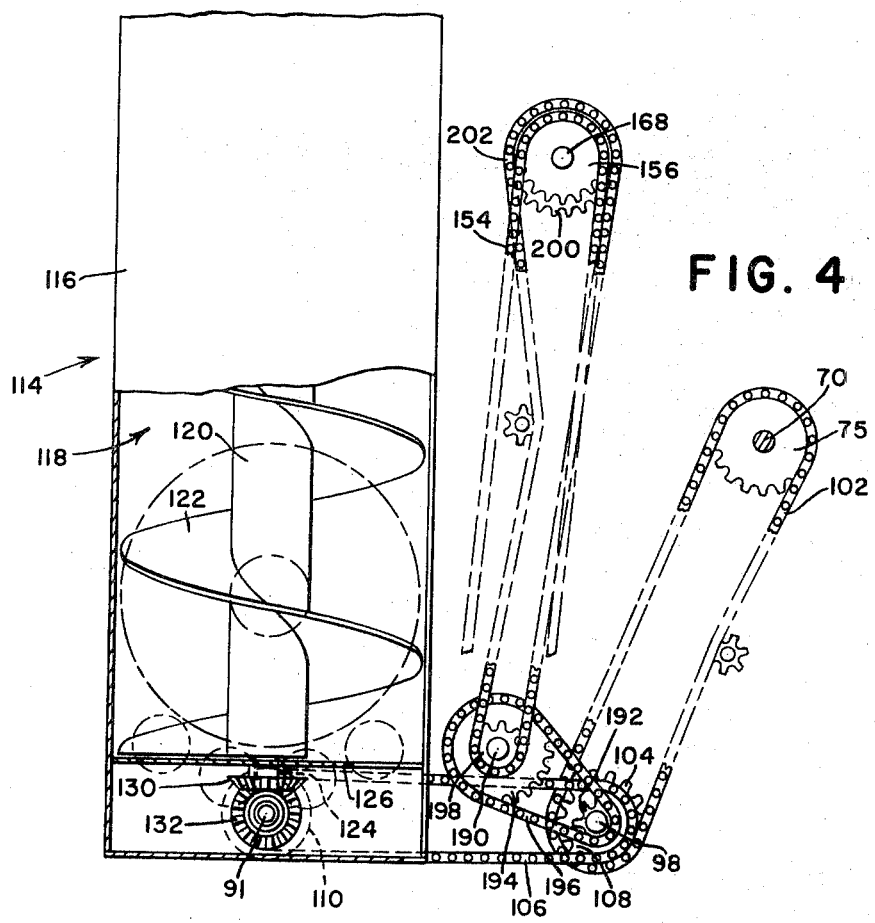
FIG. 4 is a somewhat schematic elevational view of the drive train for the conveyor apparatus as seen from the right side of the harvester.

Referring now to FIGS. 2-4 of the drawings which illustrate the conveyor apparatus of the invention in greater detail, the cylindrical wall 116 of the vertical auger housing 114 is provided in its lower forward portion with an opening 150 elongated in the axial direction of the auger. A plurality of paddles 152 are supported exteriorly of the housing 114 for successive movement upwardly through the housing between axially adjacent portions of the helical flight 122, to assist the auger in conveying beets upwardly through the housing. The paddles are supported at space points on an endless roller chain 154 which is trained around upper and lower sprockets 156 and 158, respectively, to form drive and return runs between the rear and forward sides of the sprockets, respectively. A vertical plate 160 is bolted along one edge to the housing 114 and extends forwardly therefrom to support the paddle apparatus. A second, elongated support plate 162 is maintained in parallel, spaced relation from the plate 160 by a plurality of bolts 164 and spacers 166. The sprockets 156 and 158 are journaled at the upper and lower ends of the plate 162 on the outer ends of shafts 168 and 170 which extend through aligned holes in the plates 160 and 162. Spacers 172 and 174 and a cotter pin 176 cooperate to maintain each of the sprockets 156 and 158 in proper position relative to the support plates.

Each paddle 152 is generally L-shaped and includes a material-engaging face portion 178 and an angled inner end portion 180. One leg portion of a short length of angle iron 182 is secured to transversely opposed links of the chain 154, and theother leg portion is bolted to the material-engaging face 178 of one of the paddles 152. The inner end of each paddle has an L-shaped member 184 secured thereto. A bolt 186 is supported in aligned holes in the angled end portion 180 of the paddle 152 and in the parallel leg of the L-shaped member 184 and has a pair of roller 188 supported on its ends outwardly of the portion 180 and member 184. The inner roller 188 rides between and is rollingly engageable with the support plates 160 and 162, and the outer roller 188 is rollingly engageable with the support plate 160. The rollers 188 act to absorb forces imposed on the material-engaging face of the paddle 152 by the material being conveyed within the housing 114. An L-shaped wall portion 189 extends between the outer end of the support plate 160 and the housing wall 116 to enclose the right side of the paddle apparatus.

Referring now to FIG. 2 of the drawings, it will be seen that the upper sprocket 156 is disposed forwardly of the lower sprocket 158 so that the rear or drive run of the chain 154 is angled away from the housing wall 116 in the direction in which material is conveyed by the auger 118. As the paddles 152 advance upwardly through the opening 150 in the wall 116, they are thus gradually withdrawn forwardly through the opening. It will be appreciated that any beet damage which may result from the movement of the paddles relative to the housing wall is thus maintained at a minimum level.

Beet damage is further minimized by the fact that the pitch dimension of the paddle apparatus, or the distance between the trailing edges of adjacent paddles on the drive run of the chain 154, designated $P_p$ in FIG. 2 of the drawings, is slightly greater than the pitch dimension of the helical auger flight 122, or the distance between axially adjacent flight portions, designated $P_f$ in FIG. 2. The auger and paddles drives are timed so that each paddle enters the lower end of the housing 114 with its trailing edge in close proximity to the leading surface of the flight 122. Due to the difference in the two pitch dimensions, the clearance between the paddle and flight increases as the paddle moves upwardly through the housing, with the result that beets are prevented from being pinched between these elements.

The drive mechanism for the paddle apparatus is shown somewhat schematically in FIG. 4 of the drawings and includes a transverse shaft 190 supported in a conventional manner (not shown) near the lower forward portion of the auger housing 114. A sprocket 192 on the outer end of the shaft 98 is drivingly connected to a sprocket 194 on the shaft 190 by means of a chain 196, and a second sprocket 198 on the shaft 190 is drivingly connected to a sprocket 200 on the outer end of the shaft 168 which supports the upper sprocket 156 of the paddle apparatus, by means of a chain 202.

It will be noted from FIG. 2 of the drawings that the paddle apparatus includes an odd number of paddles 152 secured to the chain 154 at equal intervals. In operation, therefore, paddles alternately pass around the upper and lower sprockets 156 and 158 and the acceleration forces exerted on the mechanism as a result of the paddles passing around the sprockets occur alternately rather than simultaneously. It has been found that this arrangement substantially improves the durability of the paddle apparatus drive mechanism.

I claim:

1. In material-conveying apparatus including an elongated, rotatable auger having a core with a helical flight secured thereto, the flight having a helical outer edge and a continuous leading material-engaging surface with axially spaced portions, the flight further having a substantially uniform pitch dimension so that axially aligned portions thereof are uniformly spaced, and an elongated housing having an arcuate wall portion at least partially enclosing the auger and disposed adjacent and substantially concentric to the outer edge of the flight, the flight being operative to engage and convey material along the housing when the auger is rotated, paddle means cooperable with the auger to assist in conveying material, said paddle means comprising: a first roller disposed adjacent to and spaced outwardly of the housing wall; a second roller spaced from said first roller in the direction in which material is conveyed by the flight and spaced outwardly of the housing wall a distance greater than said first roller; an endless flexible element drivingly trained around said first and second rollers and having drive and return runs, the drive run lying on a line angled away from the housing wall in the direction in which material is conveyed by the flight; drive means connecting the auger and the endless flexible element for driving the latter so that the drive run thereof moves along said line in the direction in which material is conveyed by the flight as the auger rotates; a plurality of paddles each having a material-engaging face and leading and trailing edges, said paddles being mounted on the endless flexible element so that the trailing edges of adjacent paddles are spaced at a uniform pitch dimension which is greater than the pitch dimension of the flight means for moving the paddles being movable with the endless flexible element so that the material-engaging faces of the paddles on the drive run extend through the housing wall between axially spaced portions of the flight and are withdrawn outwardly from the housing as the portion of the endless flexible element forming the drive run is moved along said line, said means moving the paddles with sufficient speed so that the distance between the trailing edge of each paddle and the adjacent material-engaging surface of the flight increases as the paddle is moved through the housing.

2. The invention defined in claim 1 wherein the diameters of said first and second rollers are substantially equal and there are an odd number of paddles mounted on said endless flexible means, whereby the acceleration forces resulting from the paddles moving around the first and second rollers occur alternately as the endless flexible element is driven.

3. The invention defined in claim 1 wherein said first and second rollers are rotatably supported at the opposite ends of an elongated support, and wherein each of the paddles includes a portion engageable with said support to limit movement of the paddle relative to the support.

4. The invention defined in claim 3 wherein each of said paddles has a rotary-bearing element supported thereon rollingly engageable with the support.

5. The invention defined in claim 4 wherein said elongated support comprises a pair of spaced, parallel members and wherein said rotary-bearing elements are disposed between said members and are rollingly engageable with both members.

6. The invention defined in claim 1 wherein said leading and trailing paddle edges extend outwardly from the endless flexible element, and each paddle includes an outer edge extending between the outer ends of the leading and trailing edges, and wherein the second roller is located relative to the housing wall so that the leading edges of the paddles are withdrawn completely from the housing before the paddle passes around the second roller.

7. The invention defined in claim 1 wherein the housing wall is provided with an elongated opening through which the paddles are movable.

8. The invention defined in claim 7 wherein said auger housing includes an end closure member adjoining the wall and disposed substantially perpendicular to the axis of the auger, said end closure member being provided with an elongated opening communicating with the opening in the wall and through which the paddles are movable to enter the housing.

9. The invention defined in claim 1 wherein said aguer housing is inclined from the horizontal and has upper and lower portions, the lower portion having a material inlet opening formed therein, and wherein the paddles are movable through the lower portion of the housing adjacent to the inlet opening.

10. The invention defined in claim 9 wherein the paddles are completely withdrawn from the housing in the lower portion thereof.

11. In material-conveying apparatus including an elongated, rotatable auger having a core with a helical flight secured thereto, the flight having a helical outer edge and a continuous leading material-engaging surface with axially spaced portions, and an elongated housing at least partially enclosing the auger, said housing having an interior arcuate wall portion disposed adjacent and substantially concentric to the outer edge of the flight, the flight being operative to engage and convey material along the housing when the auger is rotated, paddle means cooperable with the auger to assist in conveying material, said paddle means comprising: at least one paddle having a material-engaging face; means supporting said paddle for movement through the housing in the direction of elongation thereof along a line angled away from the axis of rotation of the auger in the direction in which material is conveyed by the flight, from an initial position wherein the material-engaging face of the paddle extends into the housing between axially spaced portions of the flight, the material-engaging face of the paddle being withdrawn outwardly from the hosuing as the paddle is moved along said line from said initial position, the paddle including an edge disposed in spaced relation to the material-engaging surface of the flight as the paddle is moved through the housing; and means for moving the paddle through the housing in timed relation to the rotational speed of the auger so that the distance between the edge of the paddle and the material-engaging surface of the flight increases as the paddle is moved through the housing.

* * * * *

UNITED STATES PATENT OFFICE
CERTIFICATE OF CORRECTION

Patent No. 3,842,971      Dated 22 October 1974

Inventor(s) Richard Wayne Hook

It is certified that error appears in the above-identified patent and that said Letters Patent are hereby corrected as shown below:

Column 8, Line 7, after "flight" add -- ; --.

Column 8, Line 8, cancel -- being movable --.

Column 8, Line 60, change "aguer" to -- auger --.

Column 10, Line 6, change "hosuing" to -- housing --.

Signed and sealed this 31st day of December 1974.

(SEAL)
Attest:

McCOY M. GIBSON JR.
Attesting Officer

C. MARSHALL DANN
Commissioner of Patents